July 5, 1960  F. B. RYAN  2,943,583
REEL TRAILER AND CABLE LAYER
Filed April 30, 1958  5 Sheets-Sheet 1

FIG. I

INVENTOR
FRANCIS B. RYAN

ATTORNEYS

INVENTOR
FRANCIS B. RYAN

BY *Cameron, Kerkam & Sutton*

ATTORNEYS

July 5, 1960  F. B. RYAN  2,943,583
REEL TRAILER AND CABLE LAYER
Filed April 30, 1958  5 Sheets-Sheet 3

INVENTOR
FRANCIS B. RYAN

BY Cameron, Kerkam & Sutton
ATTORNEYS

INVENTOR
FRANCIS B. RYAN

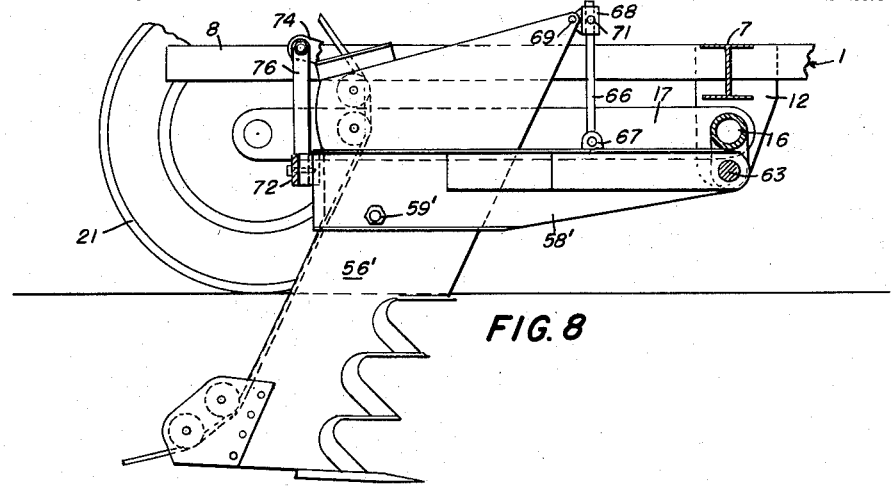
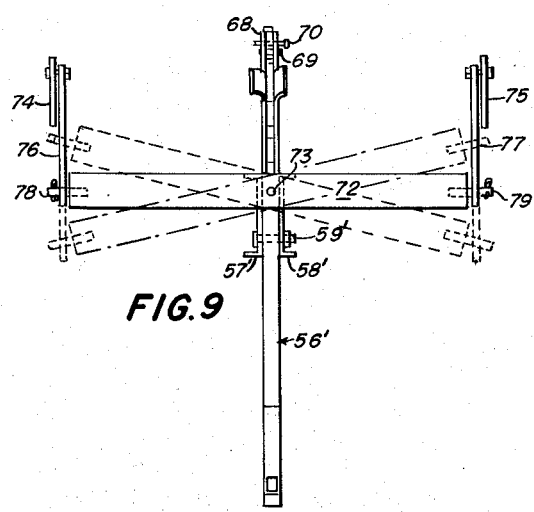
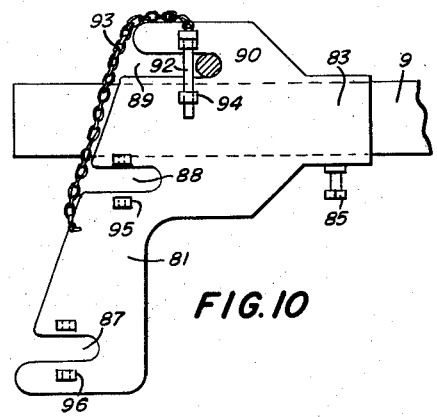
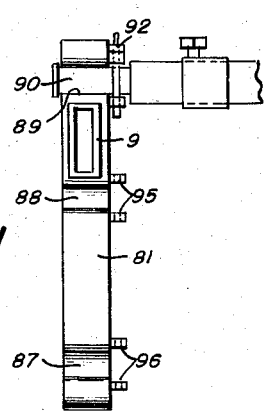

United States Patent Office 2,943,583
Patented July 5, 1960

2,943,583

REEL TRAILER AND CABLE LAYER

Francis B. Ryan, Chariton, Iowa, assignor to F. B. Ryan Manufacturing Company, Chariton, Iowa, a corporation of Iowa Filed Apr. 30, 1958, Ser. No. 732,012

6 Claims. (Cl. 111—5)

This invention relates to an improved reel trailer and cable layer designed for use over all types of terrain and adaptable both as a reel trailer alone and as a ditcher and cable layer.

The invention covers improvements on the ditching and cable laying machine disclosed in my prior Patent No. 2,647,758, of August 4, 1953.

The novel reel trailer and cable layer incorporates improved dual hydraulic linkage systems for the respective wheel arms of the trailer through which the position of the wheels of the trailer may be adjusted, as desired, with respect to the main frame thereof. It incorporates a hydraulic linkage system which is of greatly improved strength and efficiency and which may readily be adjusted to the gradient of the terrain over which the trailer is being operated.

The invention further contemplates an improved bracket and pivotal mounting for the ditching and cable laying blade and improved means for clearing and raising the blade in the event that it should strike an obstruction during the ditching and cable laying operating.

The invention includes improved, adjustable bracket means for the cable reel by means of which the height of the cable reel with respect to the main frame of the trailer structure may be regulated at will.

The invention contemplates the provision of improved dual elevating linkages for the trailer structure and improved pivotal mountings for said linkages by means of which the cable reel may be elevated to the desired height for transportation and the ditching and cable laying blade may be more readily freed from the ground, prior to transport.

In this new and improved trailer structure the respective wheel arms of the trailer may be independently adjusted to the desired angularity with respect to the main frame of the trailer to adjust the trailer to the terrain being covered and to vary the angularity of the ditching and cable laying blade, as desired.

The invention further contemplates the provision of improved mounting means for the ditching and cable laying blade and improved elevating and lowering means therefor.

In the present invention each of the independently movable wheel arms is actuated through its own hydraulic linkage system and the ditching and cable laying blade is pivotally mounted in its own independent mounting system for more efficient usage.

It is therefore a primary object of this invention to evolve an improved reel trailer and cable layer in which the relative positions of the wheels and wheel arms may be more efficiently independently regulated, as desired.

It is a further object of this invention to evolve such a trailer in which the ditching and cable laying blade is provided with an improved pivotal mounting, resulting in better and more efficient action from the blade.

It is an object of this invention to provide improved mounting means for the lower extremities of each of the lower linkages of the wheel arms whereby the blade may be more readily freed from the ground prior to raising it and the initial load may be more efficiently distributed, through the linkage system.

It is a further object of this invention to provide an improved and more efficient frame structure for such a trailer in which the center of mass is at the rear center of the structure.

Referring to the drawings,

Fig. 8 is a fragmentary side view of the improved mounting structure for the ditching and cable laying blade;

Fig. 9 is a fragmentary rear elevation of the mounting bracket for the blade, showing in phantom various angular positions of the pivoted cross bar;

Fig. 10 is a detailed side view of one of the improved brackets for the cable reel; and Fig. 11 is a detailed end view of the cable reel bracket.

Figure 1:
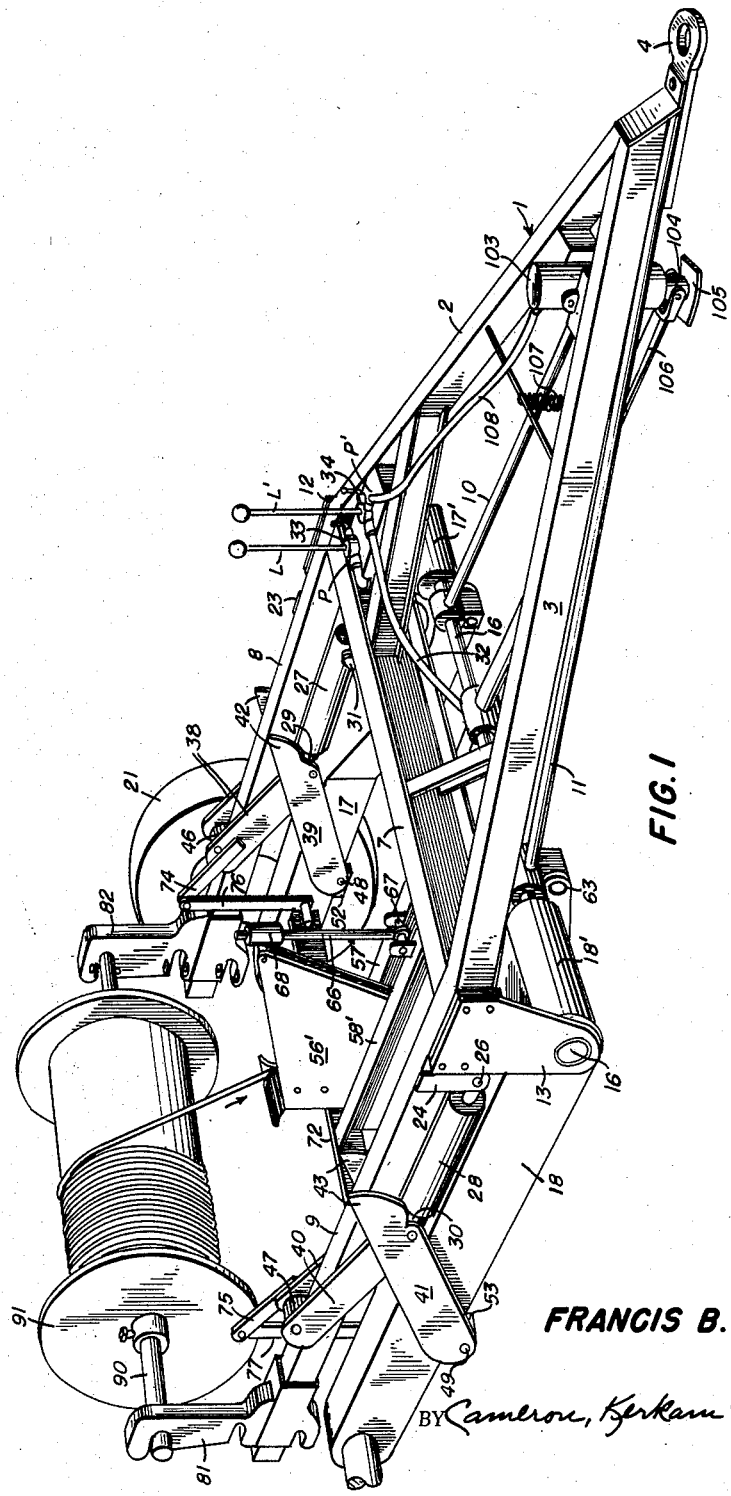
Fig. 1 is a perspective view of the improved reel trailer and cable layer with the wheel arms in retracted condition and the blade in ditching position, the right rear axle being broken off and the right wheel not being shown.

In the drawings, Fig. 1, 1 indicates broadly the main frame of the trailer structure which is preferably formed of heavy rectangular steel beams or I beams and comprises broadly angular forward beams 2 and 3 which are brought together at their forward extremities and appropriately bolted or welded together at this point to carry a pintle 4. Beams 2 and 3 are preferably bent inwardly at an angle of approximately 45° adjacent their medial sections at 5 and 6 and at this point are braced by lateral cross beam 7, which is welded or otherwise affixed therebetween. Beams 2 and 3 are thence extended rearwardly in parallel rear sections 8 and 9 which extend to the rear of the trailer in the same horizontal plane. As shown, longitudinal bracing bars 10 and 11 are provided beneath the forward section of the frame between the forward juncture of side rails 2 and 3 and journals on axle 16. Angular bracing bars are provided between rear beam sections 8 and 9 and lateral bracing beam 7 to strengthen the terminal end of the trailer and to maintain terminal beams 8 and 9 in proper alignment with respect thereto. It will thus be seen that the main frame structure comprises forward beams 2 and 3, lateral beam 7 and rear beams 8 and 9, all in the same plane.

Affixed to the forward extremities of rear beams 8 and 9 and depending downwardly therefrom are axle brackets 12 and 13 which are appropriately affixed as by bolting or welding at the forward extremities of beams 8 and 9 and depend downwardly an appreciable distance therebelow to provide terminal bearings 14 and 15 for the extremities of lateral axle 16 of the structure which extends across the width of the trailer under lateral beam 7 thereof.

Mounted at the lateral extremities of axle 16, inwardly of brackets 12 and 13, are wheel arms 17 and 18, which are widened at their forward extremities and provided with bearings 17' and 18' fitted about the lateral extremities of axle 16. As shown, wheel arms 17 and 18 are widened at their forward extremities on axle 16 and are tapered to their rearward extremities. Freely rotatable tired wheels 21 and 22 are rotatably mounted on stub axles at the lateral, rear extremities of wheel arms 17 and 18. Wheel arms 17 and 18 are shorter in length than rear beams 8 and 9 of the main frame structure, whereby beams 8 and 9 extend rearwardly beyond wheel arms 17 and 18. It will thus be seen that wheel arms 17 and 18 are independently pivotally mounted at their widened forward extremities on the lateral extremities of main axle 16 and may be independently pivoted thereon with respect to rear beams 8 and 9.

Pivotally mounted at their forward extremities beneath rear beams 8 and 9 in depending brackets 23 and 24 as by pivot bolts 25 and 26 are hydraulic cylinders 27 and 28, provided with pistons 29 and 30. Hydraulic lines 31 and 32 lead to the heads of cylinders 27 and 28 from hydraulic hand pumps P and P' provided with valves 33 and 34, mounted, as shown, at the rear extremity of beam 2 of the main frame, adjacent cross beam 7.

Pumps P and P' are preferably of the hand actuated type provided with operating levers L and L'. Pumps of the "Power Packer" type, as disclosed in Patent No. 2,214,257, are preferred, although any hydraulic pump of this type is satisfactory. If desired, motor driven hydraulic pumps may be utilized.

Pistons 29 and 30 are provided at their rear extremities with link eyes or bores in which are pivotally bolted at their forward pivot points as by cross bolts 36 and 37 paired control links 38—39 and 40—41. As shown, lower links 39 and 41 are elongated at their upper extremities 42—43 beyond the pivot points between the links and are sharply curved inwardly just above the pivot points at 44 and 45 to provide clearance therefor when pistons 29 and 30 are in fully retracted position in cylinders 27 and 28. This curving and cutting in of the under surfaces of the upper extremities 42 and 43 of links 39 and 41 also provides a clearance therefor at the rear extremity of the cylinders 27 and 28 when wheel arms 17 and 18 are in horizontal position with respect to rear beams 8 and 9.

The elongate upper extremities 42 and 43 on lower links 39 and 41 are designed to provide required bracing between the upper and lower links when the linkage systems are in extended or 180° position. They closely and slidably engage the lower lateral surfaces of upper links 38 and 40, when in extended condition, and thus brace the linkages.

Paired upper links 38 and 40, which slidably fit the lateral edges of rear beams 8 and 9, respectively, are pivotally affixed to the upper surfaces thereof at their upper extremities by means of bolts passed through eyes 46 and 47 which are mounted on the upper surfaces of beams 8 and 9 toward their rearward extremities. The lower extremities of lower paired links 39 and 41 are joined by bolts 48 and 49 which are longitudinally slidable within slots 50 and 51 of downwardly depending brackets 52 and 53 affixed to the lower surfaces of wheel arms 17 and 18 adjacent their rear extremities. As has hereinbefore been stated, links 38—39 and 40—41 are paired links, upper links 38 and 40 slidably engaging the sides of rear beams 8 and 9, respectively, and lower links 39 and 41 being paired about and slidably engaging the lateral edges of wheel arms 17 and 18, respectively. This paired construction of the links greatly increases the strength and stability of the hydraulic linkage system and the stability of the entire trailer structure.

Figure 5:
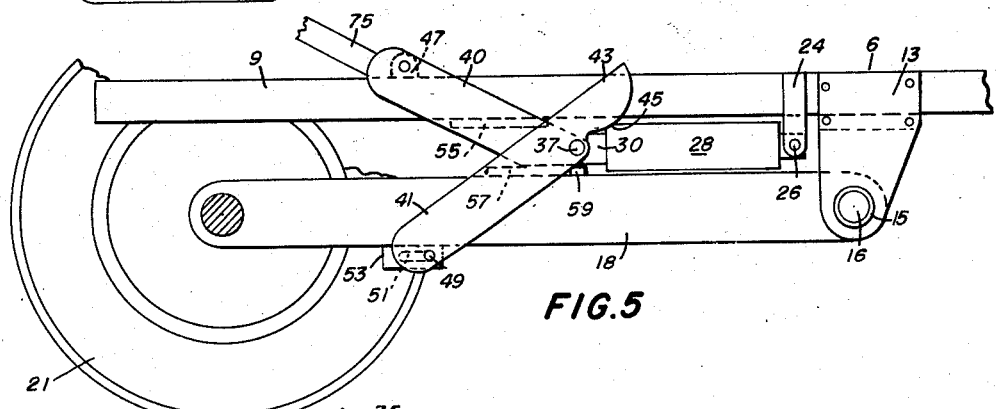
Fig. 5 is an enlarged fragmentary side view of the hydraulic linkage system for one of the wheel arms, in lowered position, the right wheel being removed.
Figure 6:
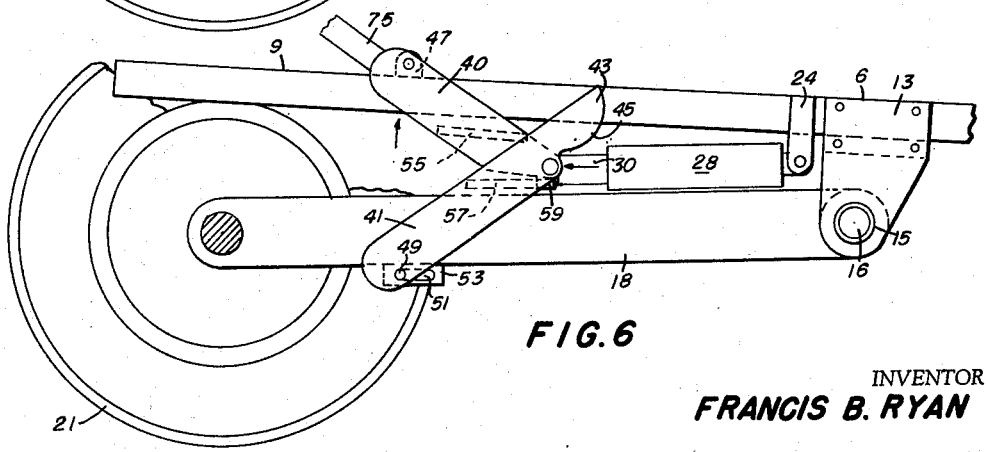
Fig. 6 is an enlarged fragmentary side view of one of the wheel arms and its linkage system in partially elevated position, the right wheel being removed.

As is shown in Figs. 5 and 6, bracing bars 55 are provided extending laterally between each of the upper pairs of links 38 and 40, respectively, and welded or otherwise affixed therebetween adjacent their lower extremities in such manner that when pistons 29 and 30 are in fully retracted position the lower surfaces of rear beams 8 and 9 will rest firmly thereagainst. Similarly, lower paired links 39 and 41 are provided adjacent their upper extremities with laterally disposed bracing bars 57 which are horizontally mounted therebetween in such position that when pistons 29 and 30 are in fully retracted position the upper surfaces of wheel arms 17 and 18 will firmly engage bracing bars 57, respectively. The provision of these bracing bars not only greatly increases the strength of the linkages 38—39 and 40—41 but also serves to support and stabilize the entire structure when the linkages are in fully retracted position and a ditching or cable laying operation is being conducted.

Sliding blocks 58 and 59 are provided at the lower extremities of upper links 38 and 40, respectively, normally resting on the upper surface of wheel arms 17 and 18 when the linkages are in "collapsed" condition. When the hydraulic pumps are actuated, supplying fluid to the heads of cylinders 27 and 28, forcing pistons 29 and 30 rearwardly, pins 48 and 49 of lower links 39 and 41 slide rearwardly in slots 50 and 51 of brackets 52 and 53 on the underside of wheel arms 17 and 18 until the linkages 38—40 and 39—41 have assumed substantially a 90° angle. During the rearward motion of lower links 39—41 the weight of the upper links is carried by sliding blocks 58 and 59 which slide rearwardly on the upper surfaces of wheel arms 17 and 18 until pins 48 and 49 of lower links 39 and 41 reach the rear extremities of slots 50 and 51 of brackets 52 and 53. Thus, it will be seen that upper links 38 and 40 start raising the load until the upper and lower links reach an angle of approximately 90°, at which point both upper and lower linkages go to work to raise the load together. The provision of this novel structure requires less cylinder pressure than would be required if both upper and lower linkages were raising the load from fully "collapsed" position, as in Fig. 5. Further, sliding blocks 58 and 59, at the forward extremities of the upper links 38 and 40, resting on wheel arms 17 and 18, carry the load of the upper links until the linkages reach an efficient angle of approximately 90°. This greatly decreases the cylinder pressure necessary to actuate the linkage system and start the raising operation.

Figure 2:
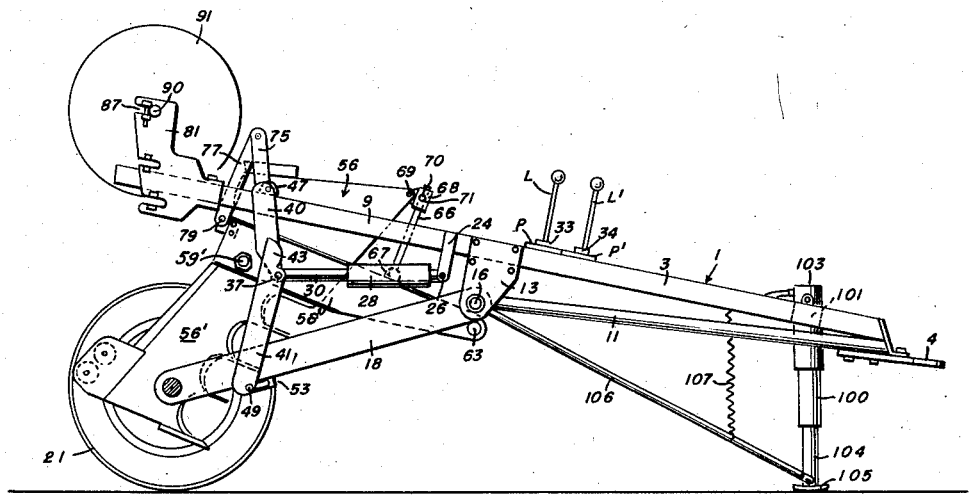
Fig. 2 is a side view of the trailer structure in fully elevated position, the right wheel being removed.
Figure 3:
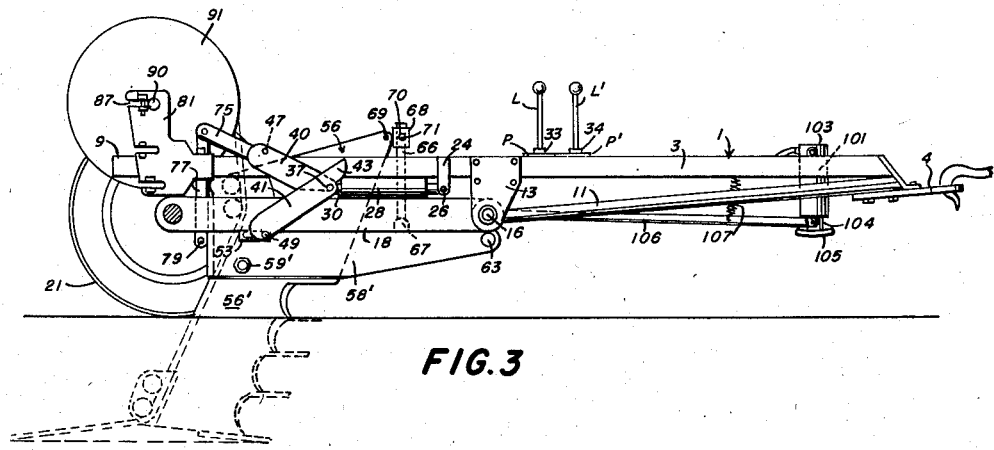
Fig. 3 is a side view of the trailer structure in fully lowered position, with the ditching blade in the ground and in cable laying position, the right wheel being removed.
Figure 4:
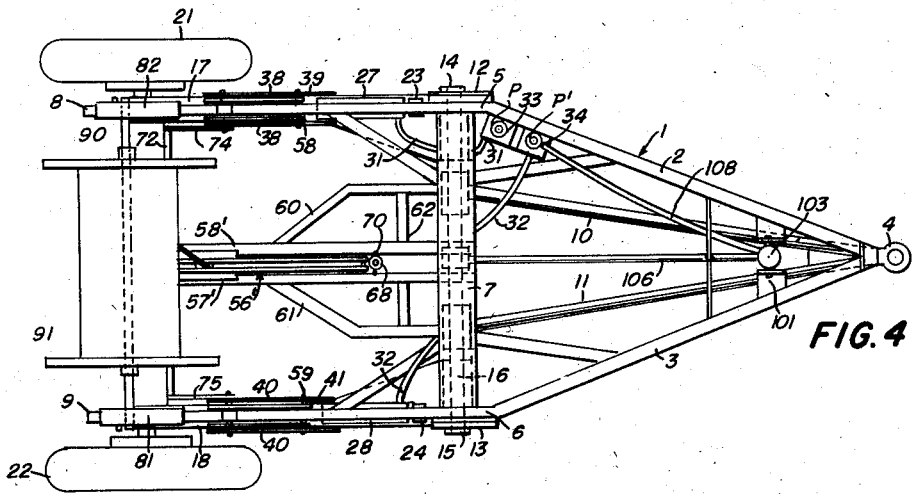
Fig. 4 is a top elevation of the trailer in cable laying or lowered position.

The manner of mounting the ditching and cable laying blade in the trailer structure will now be discussed in detail. The ditching blade used with the present trailer is preferably made in conformity with my prior Patent No. 2,632,265 of March 24, 1953. Referring to Figs. 2, 3 and 4, specifically, blade 56' is preferably mounted centrally of the rear extremity of the trailer structure in a vertical position between paired beams 57' and 58' between which it is affixed by means of a bolt 59' which extends through the bored rearward extremities of beams 57' and 58' and through an appropriate registering hole bored through blade 56', adjacent its upper, rear extremity. Blade 56' is normally fixedly mounted between beams 57' and 58', but bolt 59' acts as a pivot under certain circumstances, as will hereinafter be more fully discussed. Blade beams 57' and 58' are appropriately braced and supported by bracing members 60 and 61 and cross brace member 62 which are welded or otherwise affixed thereto and extend forwardly and are appropriately trunnioned about auxiliary axle 63 which is suspended beneath cross beam 7 and main axle 16 by means of appropriate hangers 64 and 65 depending downwardly from the lower extremities of cross beam 7. It will thus be seen that the supporting beams for the blade 56' are pivotally mounted on axle 63 at their forward extremities.

Extending upwardly from between beams 57' and 58' adjacent the forward extremity of blade 56' is rod member 66 which is pivotally mounted therebetween at its lower extremity by pivot pintle 67. Pivotally affixed at the upper, forward extremity of blade 56' by pin 69 is cylindrical collar 68. Collar 68 is preferably bored through its center at 70 and a shear pin 71 is provided passing through bore 70 and a corresponding bore in rod 66 to provide a forward support for the ditching blade. Thus, it will be seen that ditching blade 56' is supported between beams 57' and 58' by bolt 59' and at its forward extremity by pivoted rod 66 and collar 68. This mounting for blade 56' is provided to protect the blade in the event that it should strike an obstruction. When an obstruction is met shear pin 71 breaks, permitting sleeve 68 to slide downwardly on pivoted rod 66 and blade 56' to swing rearwardly and upwardly over the obstruction on bolt 59'. This aspect of the invention will be discussed more fully further on.

With respect to the control of the relative vertical position of the ditching blade 56', blade beams 57' and 58' are provided at their rear, upper extremity with a horizontally disposed control or cross bar 72, which is pivotally mounted at its center on a pin or pintle 73 affixed by means of a small auxiliary block and bolts between the ends of blade beams 57' and 58'. The extremities of cross bar 72 are suitably tied into the main hydraulic linkage system, as follows: The inner links of upper paired links 38 and 40 are provided with extension links 74 and 75 which, as shown, are of length substantially equal to that of the upper links 38 and 40 and are rigidly affixed thereto, as by bolting. Auxiliary links 76 and 77 are pivotally affixed to the upper extremities of links 74 and 75 and depend downwardly therefrom. Links 76 and 77 are provided with enlarged bores or holes in their lower extremities in which pins 78 and 79 affixed in the lateral extremities of cross bar 72 are free to oscillate. Pins 78 and 79 are of smaller diameter than the bores in the extremities of links 76 and 77 and extend outwardly therefrom an appreciable distance. This loose connection by way of enlarged holes in the extremities of links 76 and 77, in which the terminal pins 78 and 79 of cross bar 72 have considerable play, and the ability of auxiliary links 76 and 77 to pivot rearwardly and forwardly at their points of pivotal connection at the tops of extension links 74 and 75 prevents binding when the linkage systems are unequally actuated to lower one wheel arm and bar 72 assumes a compensating angular inclination on its central mounting pin 73. Terminal pins 78 and 79 of cross bar 72 are preferably bored at their outer extremities and provided with cotter pins to prevent their displacement from the bores in the extremities of links 76 and 77.

It will thus be seen that movement of links 38 and 40 is directly translated through upper links 74 and 75 and auxiliary links 76 and 77 to the extremities of cross bar 72, which is capable of angular movement of some 10° about its central pivot 73 to compensate for a variance in angularity between the wheel arms and their respective linkage systems.

Figure 7:
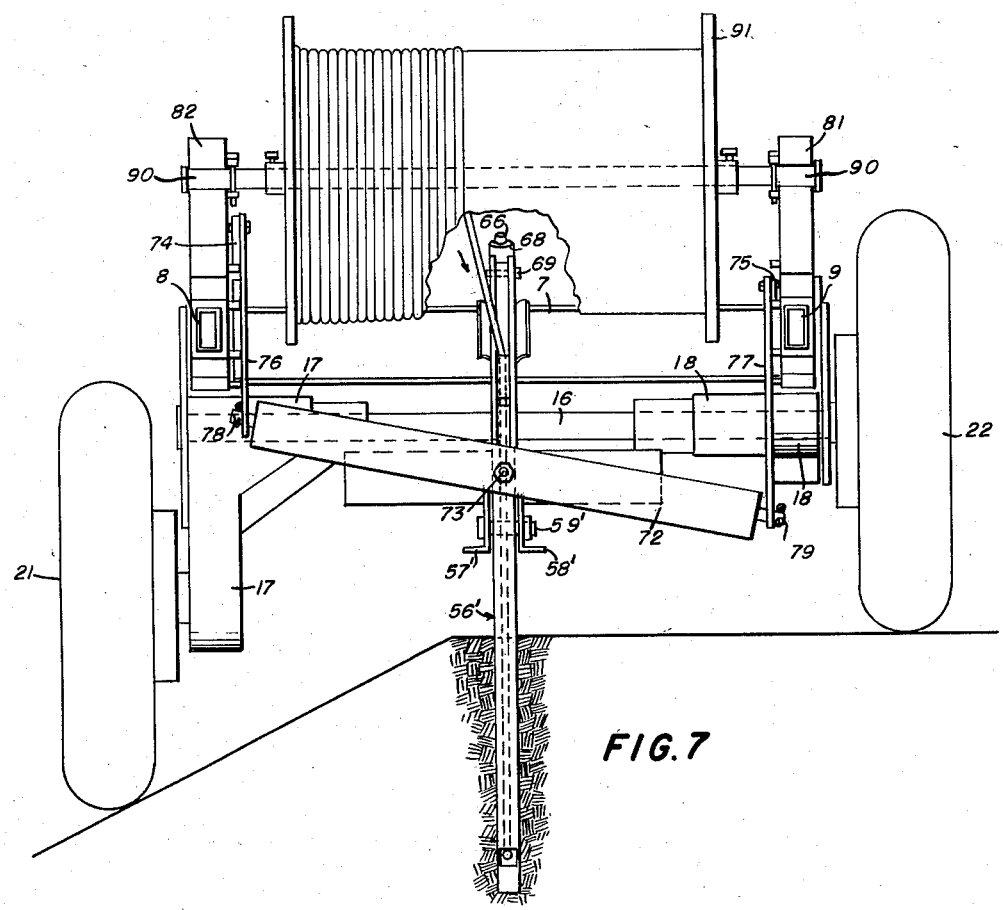
Fig. 7 is a rear elevation showing the blade bracket and mounting, with one wheel of the machine lowered and the cross bar for the blade bracket angularly inclined on the bracket pin, to compensate therefor.

By providing extended link sections 74 and 75 and auxiliary links 76 and 77 connected to the extremities of cross bar 72 it is possible to raise the blade in its pivoted bracket sufficiently high above the ground, as shown in Fig. 2, to enable it to clear the ground during transportation. Further, as a result of this auxiliary linkage system and cross bar 72, pivotally mounted at its center on pin 73 affixed between the extremities of blade beams 57' and 58', the relative vertical position of blade 56' with respect to the main frame may be varied as desired and its depth of penetration into the ground may be regulated through the main linkage system. Also, where it is necessary, during ditching, to lower one wheel below the other, as shown in Fig. 7, pivoted cross bar 72 will incline angularly on its pivot 73 and will compensate for differences in extension between the main linkages, blade 56' remaining in desired ditching position.

The improved means for mounting the cable reel above the extremities of rear beams 8 and 9 of the main frame comprises identical bracket members 81 and 82 adapted to be fitted over the extremities of rear beams 8 and 9 of the frame and slidable thereon, whereby their relative longitudinal position on rear beams 8 and 9 may be adjusted as desired. Brackets 81 and 82, shown in detail in Figs. 10 and 11, are preferably elongate angular members of appreciable width provided adjacent one extremity with rectangular bores 83 and 84 of such size as to closely and slidably engage over rear beams 8 and 9. Bores 83 and 84 are preferably provided adjacent their forward extremities with set screws 85 and 86, by the tightening of which brackets 81 and 82 may be locked in desired position on beams 8 and 9. At their rearward extremities brackets 81 and 82 are angular and are provided with a series of preferably three horizontal slots 87, 88 and 89 designed to receive the extremities of axle 90 of cable reel 91. An appropriate lock pin 92 is provided affixed by a chain 93 to bracket 81 designed to fit into paired keepers or hasps 94, 95 and 96 disposed on the outer surface of brackets 81 and 82 adjacent the inner extremities of slots 87, 88 and 89 to lock the extremities of axle 90 therewithin. It will be noted that by reversing the position of the brackets 81 and 82 from that shown in Figs. 10 and 11 slot 87 may be elevated to a much higher position above rear beams 8 and 9, enabling the handling of cable reels of large diameter. This position of the brackets is shown in Figs. 2 and 3 of the drawing. Obviously, the number of slots in the brackets may be varied as desired, as may the size and shape of the brackets.

The brace or jack member 100 for the forward extremity of the trailer is shown pivotally mounted at its upper extremity between forward side rails 2 and 3 by means of appropriate blocks and preferably comprises hydraulic cylinder 103 and extensible piston 104. Piston 104 is provided at its lower extremity with a pivotal foot member 105 designed to make firm contact with the surface of the ground. Brace bar 106 is shown pivotally mounted at its lower extremity just above foot 105 of piston 104 and at its opposite extremity is journalled on axle 16. A spring 107 is provided between brace bar 106 and the forward main frame to pull brace bar 106 upwardly and assist in the retraction of piston 104 into hydraulic cylinder 103. Hydraulic line 108 is provided connecting hydraulic cylinder 103 with valve 34 of pump P', which is preferably a two-way valve, to control the hydraulic fluid to piston 104, or conversely, to main frame hydraulic cylinder 28. Thus, when the hydraulic line to cylinder 103 is opened, pump P' being inactive, spring 107 will assist in retracting piston 104 into cylinder 103 and will maintain it in retracted position.

It will be noted that due to the improved positioning of the wheel arms 8 and 9 and the rearward and lateral disposition of wheels 21 and 22, the rearward positioning of cutter blade 56', cable reel brackets 81 and 82 and the cable reel at the extreme rearward extremity of the frame, most of the mass of the reel trailer structure is concentrated at its rearward extremity. This provision assists in the maintenance of the ditching blade 56' in proper position in the ground during the ditching and cable laying operation. Further, this concentration of mass at the rear extremity of the machine tends to maintain cable laying blade 56' in true vertical position and assures its maintaining proper position under the surface of the ground, regardless of the nature of the terrain being traversed.

When it is desired to transport the machine, pump valves 33 and 34 for the hydraulic lines to master cylinders 27 and 28 are opened, pumps P and P' are actuated and pistons 29 and 30 are then forced rearwardly in cylinders 27 and 28 to their extreme extended positions, forcing links 38—39 and 40—41 to a substantially 180° position, as shown in Fig. 2, extending the wheel arms 17 and 18 to extreme lowered position and raising the rear beams 8 and 9, blade 56' and cable reel 91 to extreme elevated position, as shown in Fig. 2, for transport. The valves are then closed, maintaining the hydraulic pistons in extended position. It will be seen that due to the angular dual linkage system a comparatively short movement of the pistons results in a maximum elevation of the rear extremity of the frame, raising ditching blade 56' to such a height above the ground that it may be readily transported without danger of contact with the ground.

The provision of novel, reversible reel cable brackets 81 and 82 at the extremities of rear beams 8 and 9 makes the structure adaptable for the transport and handling of cable reels of widely varying diameters and makes it possible to handle such reels up to 8' in diameter. When cable reels of smaller diameters are used brackets 81 and 82 may be fixed to the rear frame arms in lowered position, as shown in Fig. 10. When it is desired to use a cable reel of larger diameter, brackets 81 and 82 may be loosened through set screws 85 and 86, slid off the extremities of beams 8 and 9 and reversed and replaced thereon, set screws 85 and 86 then being tightened, thus placing slots 87 of the brackets in elevated position above beams 8 and 9 for the reception of the axle extremities of the cable reel. With the axle extremities so inserted in slots 87 of brackets 81 and 82 pins 92 are then inserted through keepers 96 to maintain the axle extremities in position therein.

With respect to the mounting of the ditching and cable laying blade 56', it will be seen that blade 56' is maintained in position between beams 57' and 58' by a master bolt 59', passing through beams 57' and 58' and through a suitable bore in the upper, rear extremity of blade 56'. At its forward extremity blade 56' is maintained in position by means of pivoted rod 66, sleeve 68 and shear pin 71 which provides a firm and solid anchoring for the blade until an obstruction is met. When an impassible obstruction is met, damage to the blade is prevented by the shearing of shear pin 71 which allows sleeve 68 to slide downwardly on pivoted rod 66, blade 56' then turning about bolt 59' into elevated position until it has cleared the obstruction. With the obstruction passed, blade 56' is then swung downwardly into ditching position and shear pin 71 is replaced through the bores in sleeve 68 and rod 66 and the blade is once again in operating condition.

With respect to the rear support for the blade bracket and its association with the main linkage system of the machine, cross bar 72 is pivotally mounted at its center on pin 73 affixed between the extremities of blade beams 57' and 58', as shown in Figs. 7, 8 and 9. As aforesaid, the extremities of cross bar 72 are loosely affixed by terminal pins 78 and 79 to the bored extremities of depending links 76 and 77 which are linked to auxiliary upright links 74 and 75 of upper master links 38 and 40. Thus, motion of the master links 38 and 40 is translated through the auxiliary linkage system to the extremities of cross bar 72 and blade beams 57' and 58' when it is desired to elevate or lower blade 56'.

With respect to the hydraulic jack structure, when it is desired to actuate the jack to maintain the machine in rest position, hydraulic control valve 34 is opened to line 108, and pump P' is actuated, hydraulic fluid passing through line 108 to cylinder 103, forcing jack structure 104 downwardly against the tension of spring 107 until the jack is in fully extended position. The valve 34 is then closed, maintaining jack 104 in lowered position. When it is desired to raise the jack, opening of the valve 34 will result in the release of hydraulic pressure and the piston 104 of the jack will be retracted upwardly by spring 107.

When it is desired to raise or lower either of the wheel arms 17 or 18, the appropriate hydraulic control valve 33 or 34 is opened and pump P or P' is actuated through lever L or L', supplying hydraulic fluid under pressure to the desired master cylinder 27 or 28, actuating piston 29 or 30 to move the appropriate linkage system 38—39 or 40—41 to adjust the angularity of the wheel arm, as desired. With the wheel arm in desired position the appropriate valve is closed, maintaining the wheel arm in position. If it is desired to raise the blade 56', both valves are opened, and both pumps P and P' are actuated until the blade is raised the desired distance. The valves are then closed to maintain the blade in desired position.

Only one hydraulic line is required to each master cylinder 27 and 28 due to the fact that when the valves are opened the mass of the trailer will force the fluid back through the lines and the pistons 29 and 30 will be forced inwardly in cylinders 27 and 28.

As has hereinbefore been stated, the machine is adaptable to all types of terrains and gradients. If the cable laying operation is proceeding along a sharp crest it may be necessary to lower both wheels to the maximum to insure adequate penetration of the ditching blade. Where one wheel is on the horizontal and the other wheel must run below horizontal the wheel arm of the lower wheel is adjusted downwardly to compensate and to maintain the frame of the machine on the true horizontal and the blade in vertical position.

Normally, during ditching operations the wheel arms are in completely "raised" position, as shown in Fig. 3, with pistons 29 and 30 of hydraulic cylinders 27 and 28 in fully retracted position and main linkages 38—39 and 40—41 in "collapsed" position. In this case wheel arms 17 and 18 lie parallel beneath rear beams 8 and 9. As has heretofore been stated, with the machine in this position the mass is concentrated on the blade at the rear of the machine and stability is at a maximum.

When it is desired to free the ditching blade 56' from a cut in the ground valves 33 and 34 are opened, pumps P and P' are actuated and fluid is supplied to master cylinders 27 and 28. As pistons 29 and 30 move rearwardly the initial movement of lower links 39 and 41 is rearwardly, pins 48 and 49 thereof first sliding rearwardly in slots 50 and 51 of brackets 52 and 53 disposed at the lower rear extremities of wheel arms 17 and 18. Thus, the initial action on ditching blade 56' is through upper links 38 and 40, the auxiliary links and bar 72 and the blade is thereby given an initial angular inclination out of the cut and is thus readily broken free from the ground, prior to elevation into transport position by the auxiliary linkage system through cross bar 72, as has previously been described. The provision of the pin and slot mounting for links 39 and 41 gives flexibility to the linkage structure and as aforesaid greatly reduces the hydraulic pressure required and simplifies the operation of freeing the blade from the cut.

Further, this slotted mounting for the lower ends of lower links 39 and 41 and the provision of sliding blocks 58 and 59 on upper links 38 and 40 insures that initial lifting will be done by upper links 38 and 40, lower links 39 and 41 not joining in the lifting action until the upper and lower links have assumed a 90° angle. Thus, the lifting action is initiated with comparatively low cylinder pressure, a much lower pressure than would be required if the ends of the lower links were fixedly mounted on the wheel arms.

As is obvious, by positioning wheel arms 17 and 18 at the desired angle, blade 56' may be so lowered as to make a cut of any desired depth. Further, the angularity of blade 56' from the vertical may be controlled to enable the laying of cable under the edge of a sidewalk or at any other desired angle and depth beneath the ground.

The pumps utilized for the actuation of the hydraulic system may be of various types. In the present structure, which weighs on the order of 2250 pounds and is designed for use with a thirty six inch blade, hand operated hydraulic pumps of the "Power Packer" type are completely satisfactory and provided adequate hydraulic pressure to actuate the main pistons. Any analogous type of pump may be used.

The trailer structure may be drawn by practically any type of tractor vehicle and is designed to be attached thereto through pintle 4 at its forward extremity.

When it is desired to use the trailer structure merely for the transport of cable reels the ditching blade structure may be readily removed from its supporting beams and frame by the removal of bolt 59' between beams 57' and 58' and the driving out of shear pin 71, freeing sleeve 68 from rod 66.

The size of the trailer structure and attachments may be varied at will without departing from the spirit of the invention. Throughout, equivalents may be substituted for the elements of the combination. Changes may be made in the manner of attaching the blade and in the reel brackets without departing from the spirit of the invention.

This specification is by way of description and illustration only. Attention is directed to the appended claims for a limitation of the scope of this invention.

What is claimed is:

1. In an improved reel trailer and cable layer, a main frame comprising an angular forward section and parallel rear beams, a central bracing beam joining said frame sections, brackets depending below said frame at the extremities of said bracing beam, a lateral axle supported beneath said frame in said brackets, rearwardly extending wheel arms disposed beneath said parallel rear beams of said frame and pivotally mounted on said lateral axle at their forward extremities, a wheel rotatably mounted in a vertical plane at the rear, outer extremity of each of said wheel arms, an hydraulic cylinder pivotally affixed at its forward extremity in a bracket depending from the forward extremity of each of said rear beams and disposed between each of said rear beams and said wheel arms, a set of upper and lower paired links between each of said rear beams and said wheel arms pivotally affixed together at their forward extremities and pivotally affixed, respectively, to the extremities of the piston rods of said hydraulic cylinders, a pin through the upper extremities of each of said upper links pivotally affixing them to the upper surface of said rear beams, a slotted bracket beneath each of said wheel arms, a pin through the lower extremities of each of said paired lower links slidably engaging the slot in one of said slotted brackets, a manual hydraulic pump and valve on said main frame for each of said cylinders, a line from each of said pumps to one of said cylinders, a ditching blade bracket pivotally mounted at its forward extremity beneath said lateral axle, a ditching blade pivotally supported in said bracket and extending downwardly beneath the rear extremity of said frame, a lateral bar pivotally mounted at its center at the rear extremity of said ditching blade bracket, auxiliary linkage pivotally connecting the extremities of said lateral bar with the upper links of said paired links whereby the positions of said wheel arms with respect to said frame may be varied at will and the relative position of the ditching blade may be controlled through said hydraulic cylinders and linkages.

2. In an improved real trailer and cable layer, a main frame comprising an angular forward section and parallel rear beams, a central bracing beam joining said frame sections, a bracket depending below said frame at each lateral extremity of said bracing beam, an axle supported beneath said frame in said brackets, rearwardly extending wheel arms disposed beneath said parallel rear beams of said frame and pivotally mounted on said lateral axle at their forward extremities, a wheel rotatably mounted at the rear, outer extremity of each of said wheel arms and disposed outwardly of the rear extremity of said frame, a hydraulic cylinder pivotally affixed at its forward extremity in a bracket depending from the forward extremity of each of said rear beams and disposed between each of said rear beams and said wheel arms, a set of upper and lower paired links pivotally affixed at its pivoted forward extremity to the rear extremity of each of the pistons of each of said hydraulic cylinders and pivotally affixed at its upper and lower extremities, respectively, to the upper surface of one of said rear beams and the lower rear surface of one of said wheel arms, a hydraulic pump and valve on said main frame for each of said cylinders, a line therefrom to each of said cylinders, a ditching blade bracket pivotally mounted at its forward extremity beneath said lateral axle, a ditching blade supported in said bracket by a transverse bolt and extending downwardly beneath the rear extremity of said frame, a lateral brace pivotally mounted at its center at the rear extremity of said ditching blade bracket, auxiliary linkage pivotally connecting the extremities of said lateral brace with the upper links of said main paired links whereby the positions of said wheel arms with respect to said frame may be varied at will and the relative position of the ditching blade may be controlled through said hydraulic cylinders and linkages.

3. In an improved real trailer and cable layer, a main frame comprising an angular forward section and parallel rear beams, a central bracing beam joining said frame sections, bracket means depending below said frame at the lateral extremities of said bracing beam, a lateral axle supported beneath said frame in said bracket means, rearwardly extending wheel arms disposed beneath said parallel rear beams of said frame and pivotally mounted on said lateral axle at their forward extremities, a wheel vertically mounted at the rear, outer extremity of each of said wheel arms and disposed outwardly of the rear extremity of said frame, a hydraulic cylinder pivotally affixed at its forward extremity in a bracket depending from the forward extremity of each of said rear beams and disposed between each of said rear beams and said wheel arms, a set of upper and lower paired links at each side of said frame fitting over said rear beam and said wheel arm and pivotally affixed together at their forward extremities and to the rear extremities of each of the pistons of said hydraulic cylinders, pins through the upper extremities of each of said upper paired links pivotally affixing them across said rear beams, pins through the lower extremities of each of said lower paired links pivotally affixing them beneath said wheel arms, elongate extensions on the upper extremities of each of said lower links extending above said pistons and curved at their lower surfaces to fit thereover when in rest position, lateral bracing means between said paired links, hydraulic pumps and controls on said frame, lines therefrom to said cylinders, a ditching blade bracket pivotally mounted at its forward extremity beneath said lateral axle, a ditching blade supported in said bracket and extending downwardly beneath the rear extremity of said frame, a lateral bar pivotally mounted at its center at the rear extremity of said ditching blade bracket, auxiliary linkage pivotally connecting the extremities of said lateral bar with the upper links of said paired links whereby the positions of said wheel arms with respect to said frame may be varied at will and the relative position of the ditching blade may be controlled through said hydraulic cylinders and linkages.

4. In an improved real trailer and cable layer, a main frame comprising an angular forward section and parallel rear beams, a central bracing beam joining said frame sections, bracket means depending below said frame at the extremities of said bracing beam, a lateral axle supported beneath said frame in said bracket means, rearwardly extending wheel arms disposed beneath said parallel rear beams of said frame and mounted on said lateral axle at their forward extremities, a wheel rotatably mounted at the rear, outer extremity of each of said wheel arms, a hydraulic cylinder pivotally affixed at its forward extremity in a bracket depending from the forward extremity of each of said rear beams and disposed between each of said rear beams and said wheel arms, a set of upper and lower paired links fitted over said rear beams and said wheel arms at each side of said frame and pivotally affixed together at their forward extremities and to the rear extremity of the piston rods of said hydraulic cylinders, a pin through the upper extremities of each of said upper paired links pivotally affixing them across said rear beams, a slotted bracket beneath each of said wheel arms about which the lower extremities of each of said lower paired links are fitted, a pin through the lower extremities of each of said lower paired links slidably engaging the slot in said slotted bracket, bracing means between said paired links, a hydraulic pump and controls on said main frame for each of said cylinders, lines therefrom to said cylinders, a ditching blade bracket pivotally mounted at its forward extremity beneath said lateral axle, a ditching blade angularly mounted in said bracket and extending downwardly beneath the rear extremity of said frame, a bar pivotally mounted at its center at the rear extremity of said ditching blade bracket, auxiliary linkage pivotally connecting the extremities of said lateral bar with the upper links of said paired links, whereby the positions of said wheel arms with respect to said frame may be varied at will and the relative position of the ditching blade may be controlled through said hydraulic cylinders and linkages.

5. In an improved reel trailer and cable layer, a main frame comprising an angular forward section and parallel rear beams, a central bracing beam joining said frame sections, bracket means depending below said frame at the extremities of said bracing beam, a lateral axle supported beneath said frame in said bracket means, wheel arms disposed beneath said parallel rear beams of said frame and pivotally mounted on said lateral axle at their forward extremities, a wheel rotatably mounted in a vertical plane at the extremity of each of said wheel arms and disposed outwardly of the rear extremity of said frame, a hydraulic cylinder pivotally mounted at its forward extremity in a bracket depending from the forward extremity of each of said rear beams and disposed between said rear beam and said wheel arm, a set of pivoted paired links disposed at each side of said frame over said rear beams and said wheel arms, each of said links pivotally affixed at its pivoted forward extremity to the rear extremity of the piston rod of one of said hydraulic cylinders and each pivotally affixed at its upper and lower extremities, respectively, to the upper surface of one of said wheel arms and the lower rear surface of one of said wheel arms, an hydraulic pump and control on said main frame for each of said cylinders, a line therefrom to said cylinders, a ditching blade bracket pivotally mounted at its forward extremity beneath said lateral axle, a ditching blade supported in said bracket and extending downwardly beneath the rear extremity of said frame, a lateral bar pivotally mounted at its center at the rear extremity of said ditching blade bracket, upwardly extending and downwardly depending pivoted linkage pivotally connecting the extremities of said lateral bar with the upper links of said main paired links, whereby the positions of said wheel arms with respect to said frame may be varied at will and the relative position of the ditching blade may be controlled through said hydraulic cylinders and linkages.

6. In a cable layer and reel trailer, a frame, rearwardly extending, parallel rear beams at the rear extremity of the frame, a transverse bracing member across the middle of the frame at the forward extremities of said beams, a lateral axle mounted beneath said bracing member, wheel arms disposed beneath said rear beams pivotally journaled at their forward extremities on the outer extremities of said axle, a wheel rotatably mounted at the rear extremity of each of said wheel arms, an hydraulic cylinder pivotally mounted at its forward extremity under each of said beams between said beam and said wheel arm, a piston in each of said cylinders, individual pivoted paired links at each side of said frame over said rear beams and wheel arms pivotally affixed to one of said beams and one of said wheel arms at their upper and lower extremities, respectively, and pivotally connected to the piston of one of said hydraulic cylinders at their forward pivot points, an hydraulic pump and controls therefor for each of said cylinders on said frame, a line from each of said pumps to each of said hydraulic cylinders, a ditching blade bracket disposed beneath the rear of said frame and pivotally affixed thereto at its forward extremity beneath said axle, a ditching blade supported in said bracket beneath said frame, a transverse bar pivotally mounted at its center to the rear of said blade bracket, auxiliary links between the upper of said paired links and the extremities of said transverse bar whereby the positions of said wheel arms and said ditching blade with respect to said frame may be varied at will through said hydraulic cylinders and said links.

References Cited in the file of this patent

UNITED STATES PATENTS

| | | |
|---|---|---|
| 1,941,143 | Wickersham | Dec. 26, 1933 |
| 2,278,081 | Kramer | Mar. 31, 1942 |
| 2,647,758 | Ryan | Aug. 4, 1953 |

UNITED STATES PATENT OFFICE
CERTIFICATE OF CORRECTION

Patent No. 2,943,583                                      July 5, 1960

Francis B. Ryan

It is hereby certified that error appears in the printed specification of the above numbered patent requiring correction and that the said Letters Patent should read as corrected below.

Column 10, line 48, after "said" insert -- main --.

Signed and sealed this 3rd day of January 1961.

(SEAL)

Attest:

KARL H. AXLINE
Attesting Officer

ROBERT C. WATSON
Commissioner of Patents